UNITED STATES PATENT OFFICE.

JACOB AMBUHL, OF BRIDGEPORT, CONNECTICUT, ASSIGNOR TO SOLOMON J. GORDON, OF NEW YORK, N. Y.

COLORING AND HARDENING CLAY.

SPECIFICATION forming part of Letters Patent No. 274,543, dated March 27, 1883.

Application filed October 19, 1882. (No specimens.)

*To all whom it may concern:*

Be it known that I, JACOB AMBUHL, of Bridgeport, county of Fairfield, State of Connecticut, have invented a new and useful Improvement in Coloring and Hardening Clay, which is fully set forth in the following specification.

The object of my invention is to harden and color articles manufactured from clay. I accomplish it by the admixture of artificial neutral precipitates of metals previous to molding.

The Letters Patent of the United States to me of August 3, 1880, No. 230,729, specify the use of sulphate of iron to produce a red color and hardness in bricks when iron is not present in the clay in a natural state. This produced a fine exterior surface; but I found, in using it practically, this difficulty: The process of drying and baking had a tendency to carry the color and hardness to the surfaces, leaving the interior of the product deficient in those important respects.

My present discovery enables me to produce a perfectly uniform color and hardness throughout the entire manufactured article when completed. The precipitates I use are not at present articles of commerce. I obtain them from the sulphates of the desired metals by well-known chemical processes. If it is desired to produce a red product from clay not impregnated with iron, I dissolve three hundred pounds of sulphate of iron in fifty gallons of water; add one hundred and twelve pounds of carbonate of soda. The resultant is a neutral precipitate of iron and a liquid containing in solution the sulphate of soda. The supernatant liquid is now drawn off, water is added, and, after settling, the clear liquid is again poured off. I then use the precipitate with the water in which it is suspended for mixing with the clay for forming bricks. By reason of my precipitate never having been dried, the particles have not become at all aggregated, but are in a state of infinitesimal subdivision, and an intimate incorporation of the precipitate with the clay, such as could not possibly be had in any other way, is readily obtained by mixing from two to six per cent. of this precipitate held in solution with the clay, when the manufacture may be proceeded with in the usual manner. If other colors than red are desired, employ the precipitate of such metals as give the desired color.

What I claim, and desire to secure by Letters Patent, is—

The process of coloring and hardening articles manufactured of clay by the admixture therewith previous to molding of artificial neutral precipitates of metal held in solution, substantially as before set forth.

J. AMBUHL.

Witnesses:
 E. S. BOYNTON,
 F. HUNT.